US012796860B2

(12) United States Patent
Townsend

(10) Patent No.: US 12,796,860 B2
(45) Date of Patent: Nov. 17, 2026

(54) DRIPPINGS COLLECTION ASSEMBLY

(71) Applicant: Penelope Townsend, Studio City, CA (US)

(72) Inventor: Penelope Townsend, Studio City, CA (US)

( * ) Notice: Subject to any disclaimer, the term of this patent is extended or adjusted under 35 U.S.C. 154(b) by 1065 days.

(21) Appl. No.: 17/969,210

(22) Filed: Oct. 19, 2022

(65) Prior Publication Data

US 2024/0130564 A1 Apr. 25, 2024
US 2024/0225353 A9 Jul. 11, 2024

(51) Int. Cl.
*A47J 37/06* (2006.01)

(52) U.S. Cl.
CPC ................................. *A47J 37/0694* (2013.01)

(58) Field of Classification Search
CPC ..................................................... A47J 43/005
See application file for complete search history.

(56) References Cited

U.S. PATENT DOCUMENTS 429,099 A * 5/1890 Salmon ................... A47J 31/10 126/369.2
527,252 A * 10/1894 Stroud ................... A47J 27/04 126/369
1,169,168 A * 1/1916 Lane et al. .......... A47J 37/0704 126/339
1,650,634 A * 11/1927 Lutzler ................... A47J 37/10 126/41 R
1,961,391 A * 6/1934 Reedy et al. ........... F24C 15/16 126/41 R
2,236,992 A * 4/1941 Broadley .............. A47J 36/022 126/39 M
2,411,993 A * 12/1946 Hobson ................... A47J 37/10 126/41 R
2,459,657 A * 1/1949 Klein .................... A47J 37/067 126/41 R
3,585,922 A * 6/1971 Peterson ................. A47J 43/18 99/449
4,140,889 A 2/1979 Mason, Jr.
5,211,105 A * 5/1993 Liu ....................... A47J 37/067 99/413
5,400,703 A 3/1995 Ashcom
D359,879 S 7/1995 Fielding
6,131,506 A 10/2000 Kemper
6,668,708 B1 * 12/2003 Swinford ............ A47J 37/0694 99/449
6,952,991 B2 * 10/2005 Siegel ..................... A47J 43/18 99/449

(Continued)

FOREIGN PATENT DOCUMENTS

CA 2767481 9/2012

*Primary Examiner* — Kayla Mccaffrey

(57) ABSTRACT

A drippings collection assembly for collection of drippings during preparation of a food item includes a rack and a tray. The rack is positionable in a pan so that a grate of the rack is elevated above a bottom of the pan. The tray is selectively positionable under the rack so that a first end of the tray is positioned proximate to one of opposed ends of the rack and a second end of the tray is positioned on the pan beneath the other of the opposed ends of the rack. A depression is positioned in the tray adjacent to the second end collects drippings that fall from a food item that is positioned upon the rack.

6 Claims, 6 Drawing Sheets

(56) References Cited

U.S. PATENT DOCUMENTS

| | | | | |
|---|---|---|---|---|
| 7,587,973 | B2 * | 9/2009 | Kaliveh | A47J 37/0694 99/449 |
| D630,886 | S | 1/2011 | Thanasouk | |
| 8,365,778 | B1 | 2/2013 | Decal | |
| 8,381,642 | B2 * | 2/2013 | Krent | A47J 36/22 99/449 |
| D689,745 | S | 9/2013 | Robbins | |
| 8,646,381 | B2 * | 2/2014 | Donoho | F24C 15/16 126/339 |
| 2008/0098904 | A1 * | 5/2008 | Fouse | A47J 37/108 99/425 |
| 2010/0077929 | A1 | 4/2010 | Young | |
| 2010/0230404 | A1 * | 9/2010 | Sigler | F24C 15/16 219/732 |

* cited by examiner

DRIPPINGS COLLECTION ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to drippings collectors and more particularly pertains to a new drippings collector for collection of drippings during preparation of a food item. The present invention discloses a drippings collector comprising a tray which directs drippings from a food item on a rack to a depression in the tray.

(2) Description of Related Art Including Information Disclosed Under 37 CFR 1.97 and 1.98

The prior art relates to drippings collectors, which may comprise drip pan and rack combinations or drip pans with integral racks, some with reservoirs for collecting drippings, roasting assemblies having removable drawers that collect drippings, stackable two pan combinations that allow collection of drippings in a reservoir in a lower one of the pans, and stackable slanted sheets for layered cooking of bacon. What is lacking in the prior art is a drippings collector comprising a tray hooked to one end of an elevated rack, with the tray extending angularly to a bottom of a pan, proximate to the other end of the elevated rack, whereby drippings from a food item on the rack are directed to a depression in the tray.

BRIEF SUMMARY OF THE INVENTION

An embodiment of the disclosure meets the needs presented above by generally comprising a rack and a tray. The rack is configured to be positionable in a pan so that a grate of the rack is elevated above a bottom of the pan. The tray is selectively positionable under the rack so that a first end of the tray is positioned proximate to one of opposed ends of the rack and a second end of the tray is positioned on the pan beneath the other of the opposed ends of the rack. A depression is positioned in the tray adjacent to the second end and is configured to collect drippings that fall from a food item that is positioned upon the rack.

Another embodiment of the disclosure includes a drippings collection system, which comprises a drippings collection assembly, as described above, as well as a pan in which the drippings collection assembly is positioned and a food item positioned upon the rack. The drippings collection system also may include a baster, as described in the specification above.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
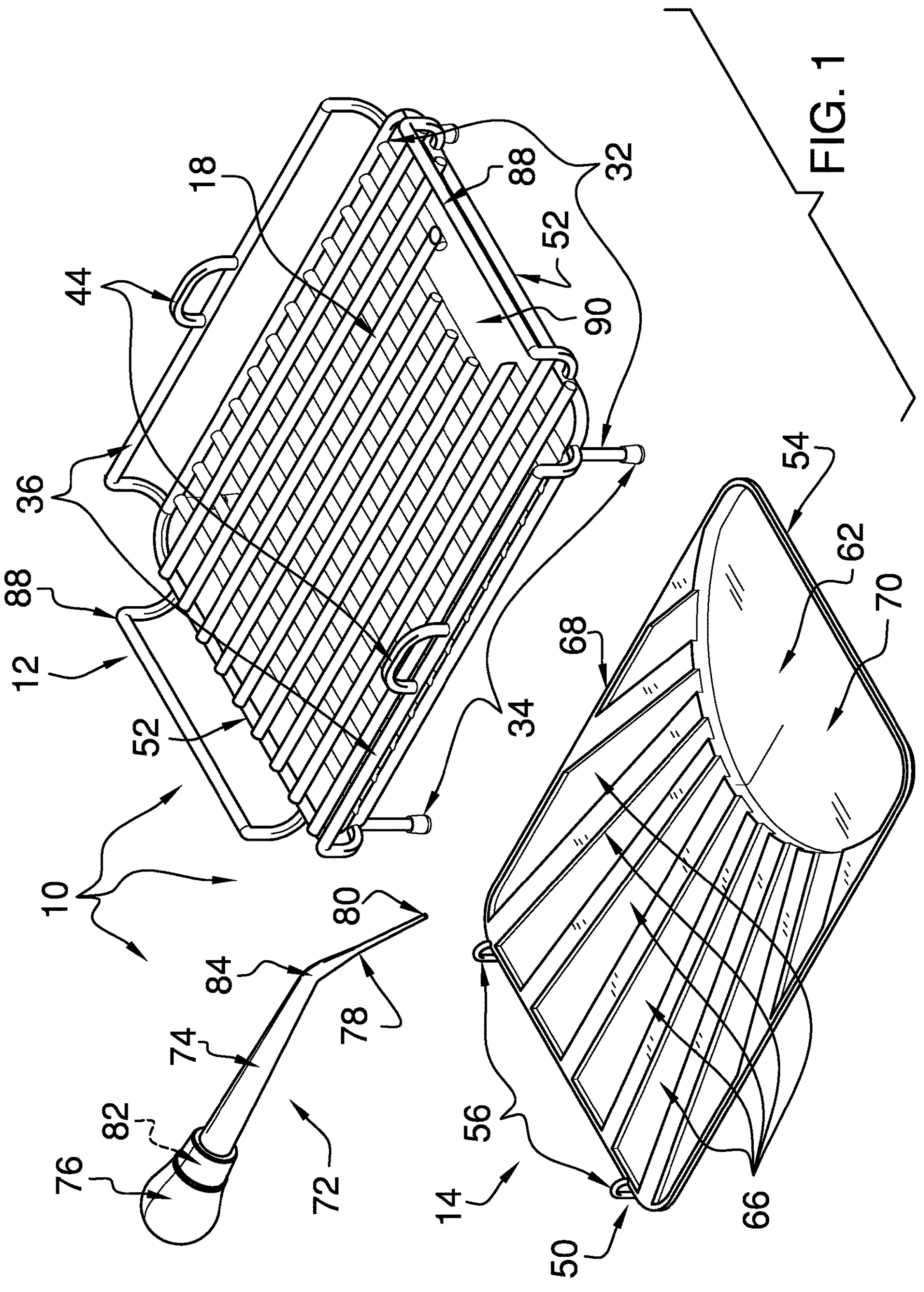
FIG. 1 is an isometric perspective view of a drippings collection assembly according to an embodiment of the disclosure.

With reference now to the drawings, and in particular to FIGS. 1 through 6 thereof, a new drippings collector embodying the principles and concepts of an embodiment of the disclosure and generally designated by the reference numeral 10 will be described.

As best illustrated in FIGS. 1 through 6, the drippings collection assembly 10 generally comprises a rack 12 and a tray 14. The rack 12 is configured to be positionable in a pan 16 so that a grate 18 of the rack 12 is elevated above a bottom 20 of the pan 16. Pan in the context of this disclosure should be interpreted to mean casserole dishes, baking pans, roasting pans, and the like.

The rack 12 comprises a plurality of first bars 22, which extends between opposite sides 24 of a perimeter ring 26. A plurality of second bars 28 extends between opposite ends 30 of the perimeter ring 26 and is attached to the plurality of first bars 22 so that the second bars 28 and the first bars 22 define the grate 18. A plurality of legs 32 is attached to and extends from the perimeter ring 26. The legs 32 are configured to elevate the grate 18 above the bottom 20 of the pan 16. Each foot 34 of a plurality of feet 34 is attached to a respective leg 32 distal from the perimeter ring 26. The feet 34 are resiliently compressible and thus are configured to deter sliding of the rack 12 within the pan 16. The feet 34 may comprise rubber, silicone, elastomer, or the like.

Each first rail 36 of a pair of first rails 36 is attached to and extends upwardly from a respective opposite side 24 of the perimeter ring 26 and extends from proximate to the opposite ends 30 of the perimeter ring 26. The first rails 36 are configured to retain a food item 38 upon the grate 18. Each first rail 36 may comprise a pair of arcuate bars 40 and a horizontal bar 42. Each arcuate bar 40 extends outwardly and upwardly from the perimeter ring 26 proximate to a respective opposite end 30 of the perimeter ring 26. The horizontal bar 42 is attached to and extends between the arcuate bars 40. The present invention also anticipates a pair of second rails 88, each of which is attached to a respective opposite end 30 of the perimeter ring 26 and which may be configured as per the first rails 36.

A pair of handles 44 is attached singly to the first rails 36. Each handle 44 may comprise a grip bar 46, which has opposing termini 48 that are attached to the first rail 36. The grip bar 46 is positioned substantially equally distant from the opposite ends 30 of the perimeter ring 26.

Figure 5:
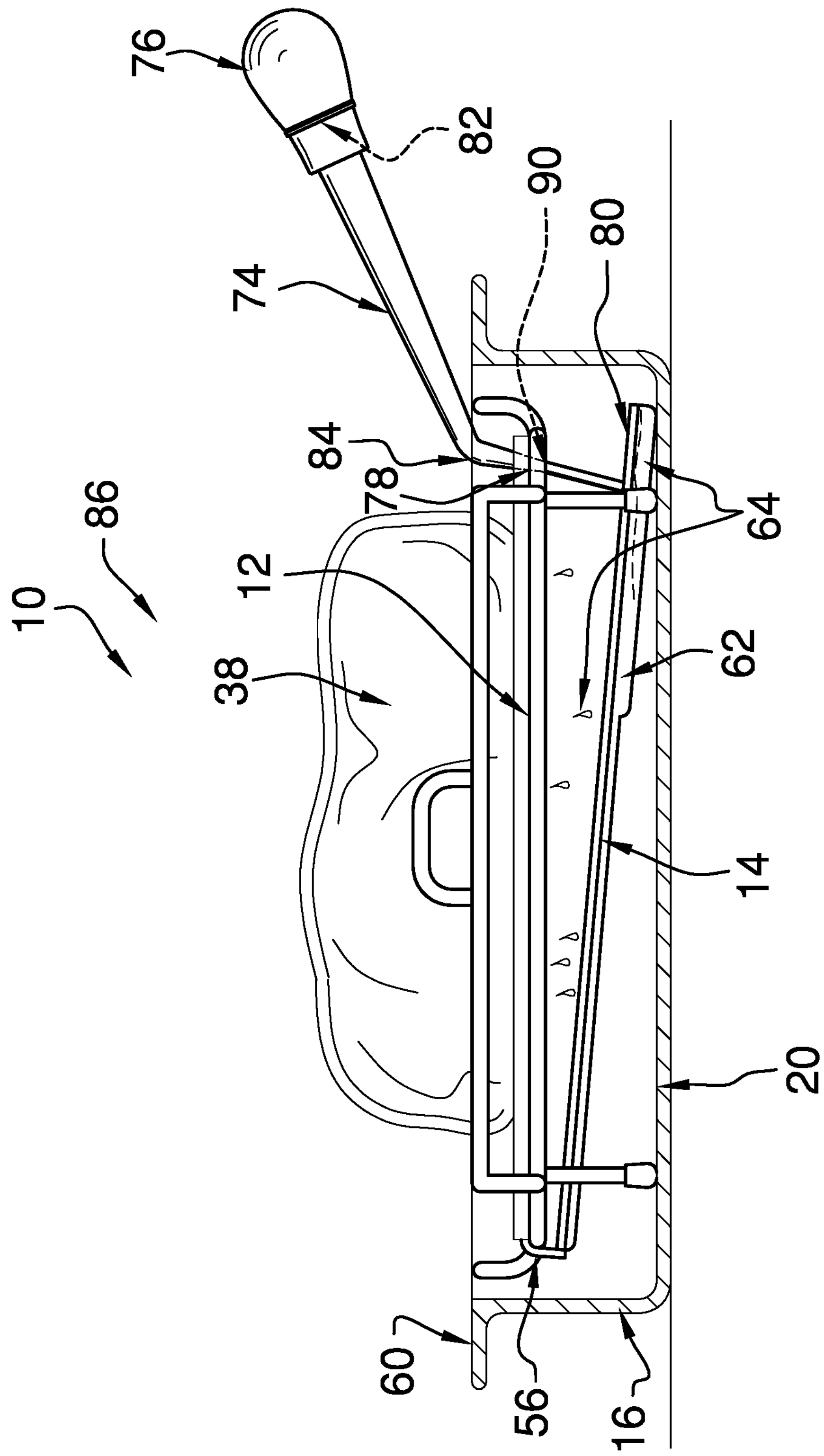
FIG. 5 is an in-use view of an embodiment of the disclosure.

The tray 14 is selectively positionable under the rack 12 so that a first end 50 of the tray 14 is positioned proximate to one of opposed ends 52 of the rack 12 and a second end 54 of the tray 14 is positioned on the pan 16 beneath the other of the opposed ends 52 of the rack 12, as shown in FIG. 5. A plurality of fasteners 56 is attached to the first end 50 of the tray 14 and is selectively attachable to one of the opposed ends 52 of the rack 12 so that the tray 14 is removably attached to the rack 12 and extends angularly from the rack 12 to a pan 16 in which the rack 12 is positioned.

Each fastener 56 may comprise a hook 58, or other fastening means, such as, but not limited to, clasps, clamps, or the like. The present invention also anticipates other means of elevating the first end 50 of the tray 14, which do not necessarily entail attachment of the tray 14 to the rack 12. For a first example, supports, which are shorter than the legs 32 attached to the rack 12, may be attached to, and extend angularly from, the first end 50 of the tray 14. The supports would position the first end 50 of the tray 14 proximate to one of the opposed ends 52 of the rack 12. For a second example, connectors, such as hooking elements, could be attached to the first end 50 of the tray 14 and be configured to engage a lip 60 of the pan 16, thereby raising the first end 50 of the tray 14 so that it is proximate to one of the opposed ends 52 of the rack 12.

A depression 62 is positioned in the tray 14 adjacent to the second end 54 and is configured to collect drippings 64 that fall from a food item 38 that is positioned upon the rack 12. The drippings collection assembly 10 is anticipated to be useful in preparation of the food item 38, prior to cooking or roasting, by collecting drippings 64 that may be generated during the preparation process. The drippings collection assembly 10 also serves to collect drippings 64 while cooking the food item 38, such as during roasting, and also collects drippings 64 during a rest period after cooking and during carving, as may be required for some food items 38, such as roasts, turkeys, and the like.

Figure 2:
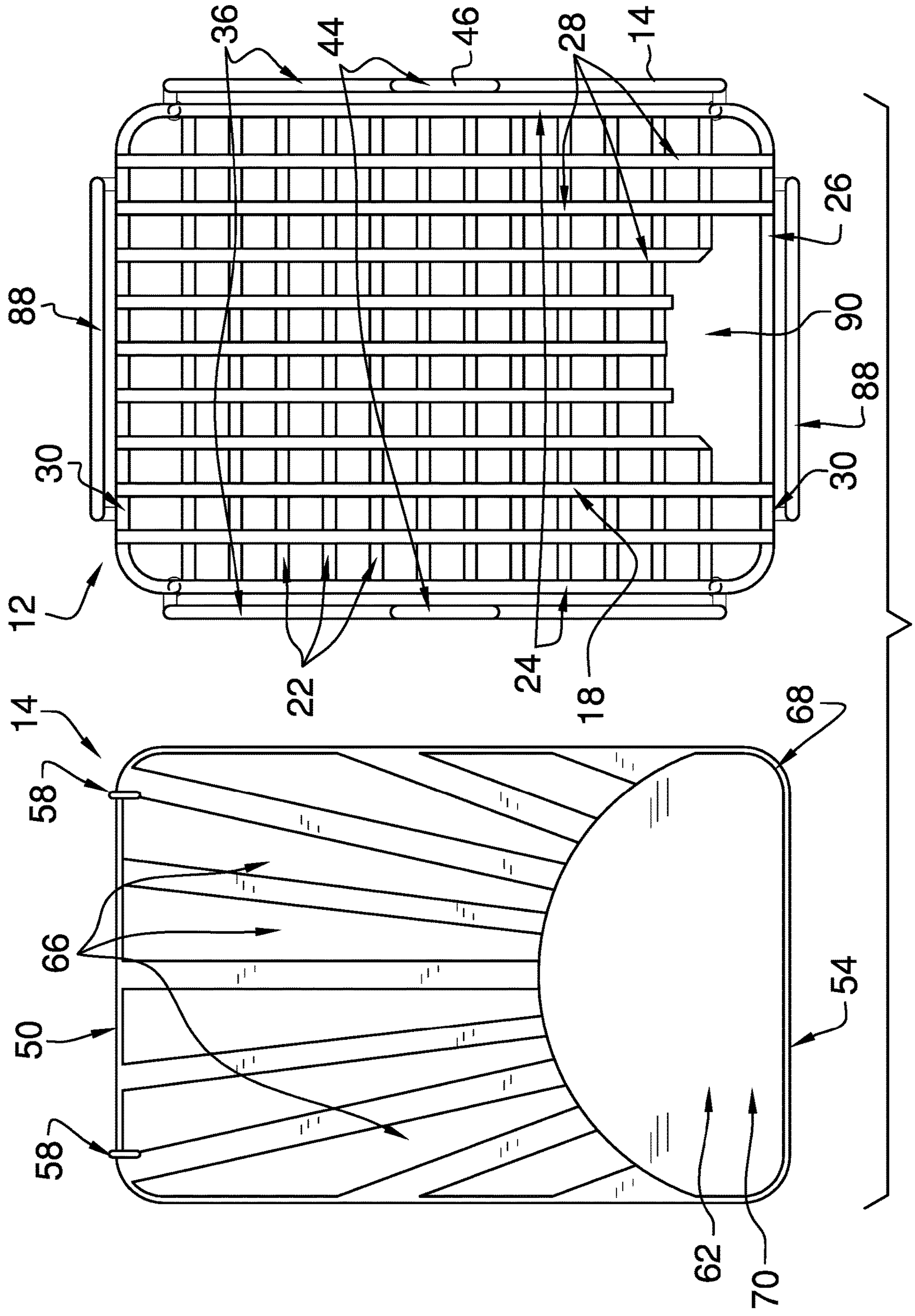
FIG. 2 is a top view of an embodiment of the disclosure.

As shown in FIG. 2, the depression 62 extends arcuately from the second end 54 toward the first end 50 so that the depression 62 is substantially hemispherically shaped. A plurality of channels 66 is positioned in the tray 14, each of which extends from the depression 62 to a rim 68 of the tray 14. The channels 66 are configured to direct the drippings 64 to the depression 62.

Figure 3:
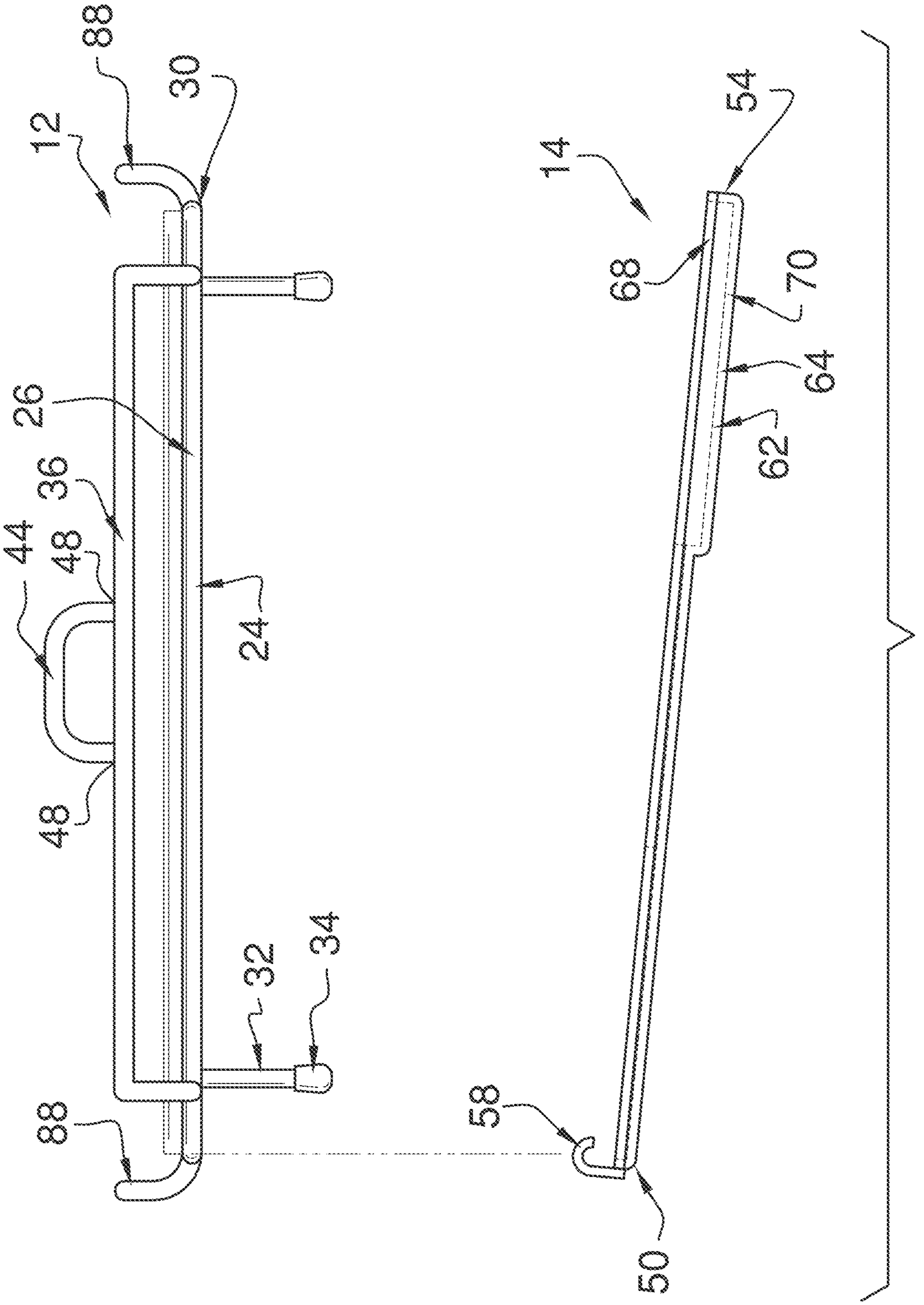
FIG. 3 is a side view of an embodiment of the disclosure.
Figure 4:
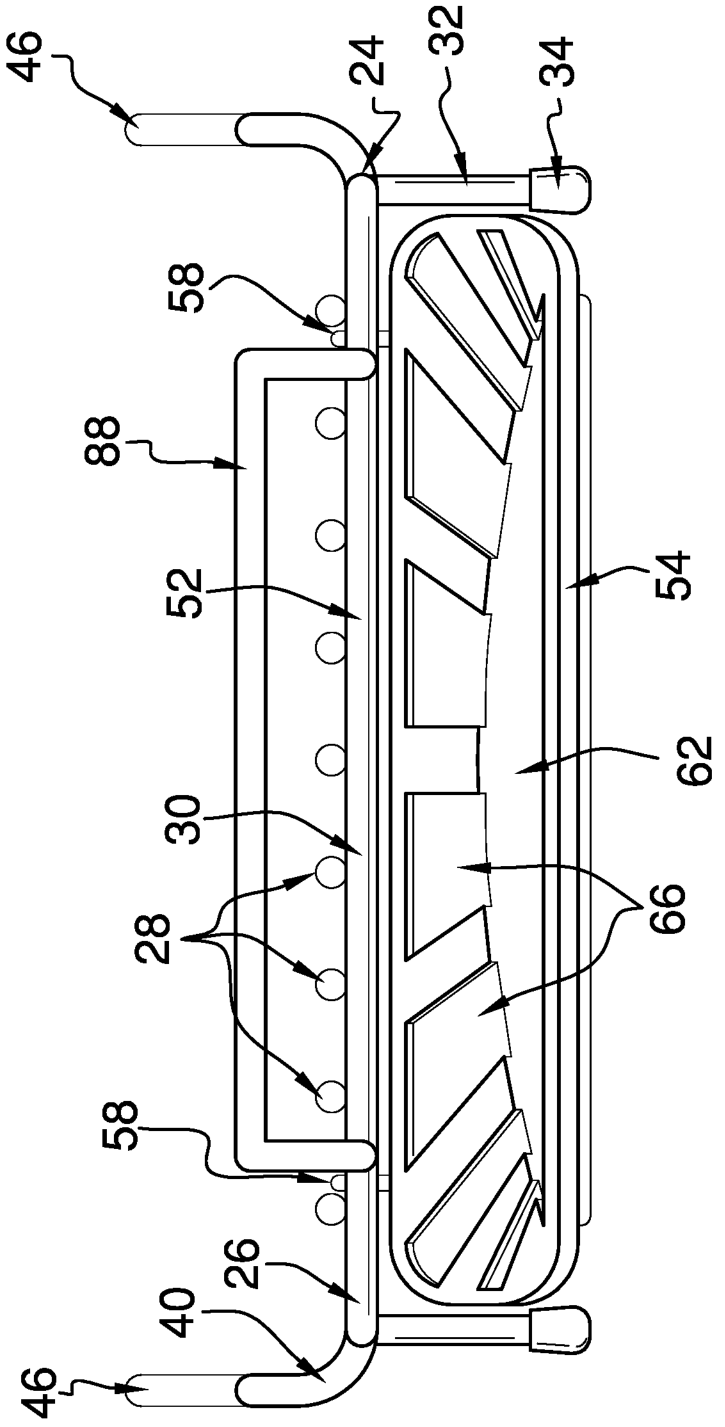
FIG. 4 is an end view of an embodiment of the disclosure.
Figure 6:
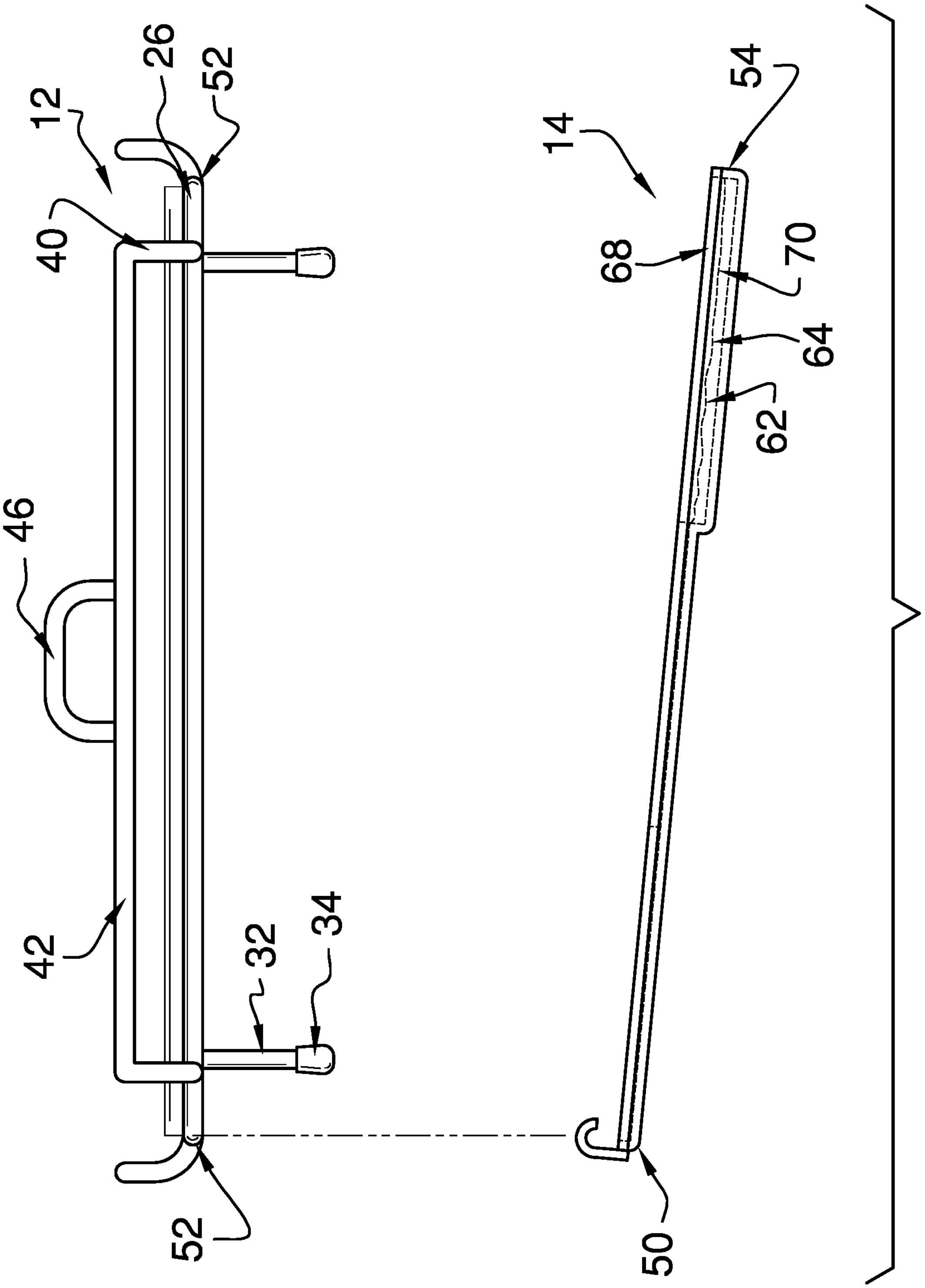
FIG. 6 is a side view of an embodiment of the disclosure.

As shown in FIG. 3, the tray 14 is substantially planar. The present invention also anticipates alternative configurations of the tray 14, such as is shown in FIG. 6. In this configuration, the depression 62 is rectangular and deeper, while the rim 68 is elevated around the depression 62. This configuration of the tray 14 increases a volume 70 of the depression 62 and allows for collection of more drippings 64.

The drippings collection assembly 10 also may include a baster 72, as shown in FIGS. 1 and 5. The baster 72 comprises a tube 74 and a bulb 76. A segment 78 of the tube 74 adjacent to a first terminus 80 of the tube 74 is tapered so that the first terminus 80 is circumferentially smaller than a second terminus 82 of the tube 74. A bend 84 is positioned in the tube 74 proximate to the first terminus 80. The bulb 76, which may comprise rubber, silicone, or elastomer, is resiliently compressible and selectively attachable to the second terminus 82 of the tube 74. The bulb 76 is configured to be grasped in a hand of a user, positioning the user to insert the first terminus 80 into the depression 62 and to squeeze and release the bulb 76 to suction drippings 64 into the tube 74. The tube 74 being bent facilitates access to the depression 62 to suction up the drippings 64 for use in basting the food item 38. As shown in FIGS. 1 and 2, the present invention also anticipates a cutout 90 positioned in the rack 12 proximate to a respective opposed end 52 of the rack 12. The cutout 90 is selectively positionable over the depression 62 and facilitates extraction of the dripping from the depression 62 using the baster 72.

The present invention also includes a drippings collection system 86, which comprises a drippings collection assembly 10, as described above, as well as a pan 16 in which the drippings collection assembly 10 is positioned and a food item 38 that is positioned upon the rack 12. The drippings collection system 86 also may include a baster 72, as described in the specification above.

In use, the tray 14 is attached to the rack 12 using the hooks 58. The tray 14 and the rack 12 then are positioned in a pan 16 and a food item 38 is positioned upon the rack 12. The food item 38 then can be cooked with drippings 64 being collected in the depression 62.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A drippings collection assembly comprising:

a rack configured to be positionable in a pan, such that a grate of the rack is elevated above a bottom of the pan;

a tray selectively positionable under the rack, such that a first end of the tray is positioned proximate to one of opposed ends of the rack and a second end of the tray is positioned on the pan beneath the other of the opposed ends of the rack; and a depression positioned in the tray adjacent to the second end, wherein the depression is configured for collecting drippings falling from a food item positioned upon the rack;

wherein the rack comprises:

a perimeter ring;

a plurality of first bars extending between opposite sides of the perimeter ring;

a plurality of second bars extending between opposite ends of the perimeter ring and being attached to the plurality of first bars, such that the second bars and the first bars define the grate; and a plurality of legs attached to and extending from the perimeter ring, wherein the legs are configured for elevating the grate above the bottom of the pan;

a plurality of feet, each foot being attached to a respective leg distal from the perimeter ring, the foot being resiliently compressible, wherein the feet are configured for deterring sliding of the rack within the pan;

a pair of first rails, each first rail being attached to and extending upwardly from a respective opposite side of the perimeter ring and extending from proximate to the opposite ends of the perimeter ring, wherein the first rails are configured for retaining a food item upon the grate;

a pair of handles attached singly to the first rails;

a plurality of fasteners attached to the first end of the tray, the fasteners being selectively attachable to one of the opposed ends of the rack, such that the tray is removably attached to the rack and extends angularly from the rack to a pan in which the rack is positioned;

wherein the depression extends arcuately from the second end toward the first end, such that the depression is substantially hemispherically shaped; and a baster comprising:

a tube, a segment of the tube adjacent to a first terminus of the tube being tapered, such that the first terminus is circumferentially smaller than a second terminus of the tube;

a bulb, the bulb being resiliently compressible and selectively attachable to the second terminus of the tube; and a bend positioned in the tube proximate to the first terminus, wherein the bulb is configured for grasping in a hand of a user.

2. The drippings collection assembly of claim 1, wherein each first rail comprises:

a pair of arcuate bars, each arcuate bar extending outwardly and upwardly from the perimeter ring proximate to a respective opposite end of the perimeter ring; and a horizontal bar attached to and extending between the arcuate bars.

3. The drippings collection assembly of claim 1, wherein each handle comprises a grip bar having opposing termini attached to the first rail, the grip bar being positioned substantially equally distant from the opposite ends of the perimeter ring.

4. The drippings collection assembly of claim 1, wherein each fastener comprises a hook.

5. The drippings collection assembly of claim 1, further including a plurality of channels positioned in the tray, each channel extending from the depression to a rim of the tray, wherein the channels are configured for directing the drippings to the depression.

6. A drippings collection assembly comprising:

a rack configured to be positionable in a pan, such that a grate of the rack is elevated above a bottom of the pan, the rack comprising:

a perimeter ring, a plurality of first bars extending between opposite sides of the perimeter ring, a plurality of second bars extending between opposite ends of the perimeter ring and being attached to the plurality of first bars, such that the second bars and the first bars define the grate, a plurality of legs attached to and extending from the perimeter ring, wherein the legs are configured for elevating the grate above the bottom of the pan, a plurality of feet, each foot being attached to a respective leg distal from the perimeter ring, the foot being resiliently compressible, wherein the feet are configured for deterring sliding of the rack within the pan, a pair of first rails, each first rail being attached to and extending upwardly from a respective opposite side of the perimeter ring and extending from proximate to the opposite ends of the perimeter ring, wherein the first rails are configured for retaining a food item upon the grate, each first rail comprising:

a pair of arcuate bars, each arcuate bar extending outwardly and upwardly from the perimeter ring proximate to a respective opposite end of the perimeter ring, and a horizontal bar attached to and extending between the arcuate bars, and a pair of handles attached singly to the first rails, each handle comprising a grip bar having opposing termini attached to the first rail, the grip bar being positioned substantially equally distant from the opposite ends of the perimeter ring;

a tray selectively positionable under the rack, such that a first end of the tray is positioned proximate to one of opposed ends of the rack and a second end of the tray is positioned on the pan beneath the other of the opposed ends of the rack;

a plurality of fasteners attached to the first end of the tray, the fasteners being selectively attachable to one of the opposed ends of the rack, such that the tray is removably attached to the rack and extends angularly from the rack to a pan in which the rack is positioned, each fastener comprising a hook;

a depression positioned in the tray adjacent to the second end, wherein the depression is configured for collecting drippings falling from a food item positioned upon the rack, the depression extending arcuately from the second end toward the first end, such that the depression is substantially hemispherically shaped;

a plurality of channels positioned in the tray, each channel extending from the depression to a rim of the tray, wherein the channels are configured for directing the drippings to the depression; and a baster comprising:

a tube, a segment of the tube adjacent to a first terminus of the tube being tapered, such that the first terminus is circumferentially smaller than a second terminus of the tube, a bulb, the bulb being resiliently compressible and selectively attachable to the second terminus of the tube, and a bend positioned in the tube proximate to the first terminus, wherein the bulb is configured for grasping in a hand of a user.

* * * * *